Feb. 28, 1956  P. R. BELL, JR  2,736,817
POCKET RADIATION METER
Filed Sept. 26, 1951  2 Sheets-Sheet 1

INVENTOR.
Persa R. Bell, Jr.
BY
Roland A. Anderson
ATTORNEY

Feb. 28, 1956  P. R. BELL, JR  2,736,817
POCKET RADIATION METER
Filed Sept. 26, 1951  2 Sheets-Sheet 2

INVENTOR.
Persa R. Bell, Jr.
BY
Roland A. Anderson
ATTORNEY

United States Patent Office

2,736,817
Patented Feb. 28, 1956

2,736,817

POCKET RADIATION METER

Persa Raymond Bell, Jr., Oak Ridge, Tenn., assignor to the United States of America as represented by the United States Atomic Energy Commission Application September 26, 1951, Serial No. 248,425

4 Claims. (Cl. 250—83.6)

The present invention relates to radiation detection instruments, and more especially to an improved portable radiation survey meter of simple, small, and rugged design.

Conventional survey instruments have many undesirable features: many are too heavy to be comfortably carried; many are sensitive only to one or two types of radiation, such as beta-gamma; most are expensive and complex to build; the circuitry is often complicated and hard to service; there is excessive battery drain, necessitating frequent replacement; a rather expensive, extremely high input resistance is used to develop an input signal; and the range of radiation intensities measurable is limited.

Workers in the prior art have extended the range of survey meters by providing several meter shunts to divide meter current, and by having a corresponding number of different scales printed on the meter face. This method of construction has led to frequent errors in meter reading due to confusion between scales, especially by unskilled operators, and is generally undesirable, for reasons set forth below.

A much better method of extending the range of a survey meter is to provide an indicator calibrated logarithmically. By such calibration, even a small meter face can be used, with a single scale, to cover the range of intensities likely to be encountered, from the harmless up to those possible from an atomic disaster. The single scale is then large enough to cover the entire range, so there is no need for multiple scales and meter shunts, with their attendant danger of mistake.

Moreover, the logarithmic calibration provides an instrument where the meter deflection is a proportional indication of radiation danger. Radiation danger does not increase with linear increase of radiation flux, but with the logarithm thereof. In addition, the calibration I have provided, taken in conjunction with the novel mode of operation of my device, is statistically superior to those of the prior art, in that it provides low sensitivity and short response time for high levels of radiation, but high sensitivity and long response time at low levels of radiation.

To obtain the desired logarithmic response, I have combined an ion chamber with a vacuum tube in a new and novel manner which, I have discovered, will provide an electric current substantially proportional to the logarithm of the radiation intensity incident upon the chamber. The current I derive is then impressed upon a meter calibrated in the desired fashion.

My invention further provides an effective survey meter of simpler circuit design than has heretofore been known, it being simpler in that it may employ fewer components. For example, one vacuum tube, two potential sources or batteries, an ion chamber, a resistor, and a meter may comprise a complete instrument.

With knowledge of the shortcomings of devices of the prior art, it is a primary object of my invention to provide means for monitoring nuclear radiations and indicating the intensity thereof in a linear-logarithmic fashion.

A further object of my invention is to eliminate the high-megohm input resistor generally required in circuits of the prior art.

Another object of my invention is to provide a survey meter comprising in combination an ionization chamber and a vacuum tube so interconnected that the vacuum tube slate current bears a substantially linear-logarithmic relation to the intensity of incident radiation upon the ionization chamber.

Still another object of my invention is to provide a simple, rugged radiation survey meter suitable for monitoring alpha, beta, and gamma radiations, and slow neutrons, and for measuring intensities over a wide range, yet utilizing only a single meter scale.

Further objects and numerous advantages of my invention will become apparent from the following detailed description wherein Fig. 1 of the drawings is a perspective view of a survey meter embodying the principles of my invention.

Figs. 4 and 5 illustrate construction details of a preferred embodiment of my invention.

In its broadest aspects, my invention comprises novel means for deriving and indicating a current proportional to the logarithm of incident radiation intensity: the combination of an ionization chamber, a vacuum tube having its control grid connected directly and solely to the ionization chamber, and current indicating means in the plate-cathode circuit of the tube. While one electrode of the ionization chamber is connected directly and solely to the grid of the vacuum tube, the other electrode of the chamber is connected to the positive terminal of the potential source energizing the tube. With such connections a current is derived substantially proportional to the logarithm of the incident radiation intensity.

The ionization chamber may be of any suitable form and size, and for a portable survey instrument may be formed, by way of illustration, simply as a cavity of suitable size in a block or molding which serves as a mounting piece for the electronic circuit components. The center electrode of the chamber may simply be a wire with a curved, conductive foil suspended thereon, or may take any other form known to the prior art of ionization chamber design, the shape or size thereof not being critical. To obtain slow neutron sensitivity, it is necessary to coat the walls of the chamber with a substance which, when bombarded with neutrons, emits some ionizing radiation, as does boron 10, for example, in the manner of the prior art.

Figure 2:
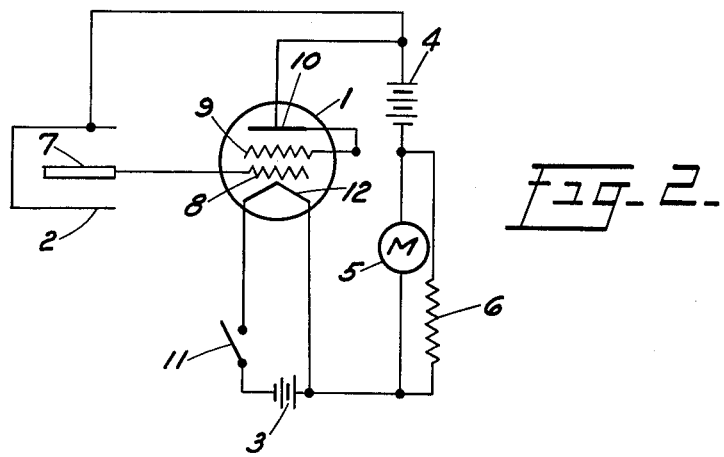
Figure 2 illustrates a preferred form of an electronic circuit interconnected with an ionization chamber to provide means for detecting radiation.

The vacuum tube may be of any suitable type desired, having at least a filament or cathode, a grid, and a plate, and may be pentode connected, tetrode connected, or triode connected, the latter connection being illustrated in Fig. 2. For miniature survey meters, the subminiature vacuum tubes such as CK571AX, VX32, and VX34A are to be preferred. For a larger size instrument, conventional size vacuum tubes may be utilized if desired. The term "vacuum tube" is used in contradistinction to "gas-filled" or "vapor-filled tube," in the conventional manner. The power sources required may be electronic supplies, or simply batteries for convenience in field service. The current indicating means may be a simple microammeter having its scale graduated in a logarithmic fashion. Any conventional meter movement may be employed for measuring the current flowing in the vacuum tube, the particular form of that means being known in the prior art and not considered as inventive herein, apart from its combination with other elements of my invention as described and set forth in the appended claims. It is desirable but not essential that the meter chosen have an adjustment for displacing its electrical zero from the mechanical zero, for reasons pointed out hereinafter.

One specific embodiment of my invention is illustrated schematically in Fig. 2. Referring to that figure, a single vacuum tube 1, an ionization chamber 2, batteries 3, 4, meter 5, and resistor 6 comprise the complete instrument. The tube 1 may be conventionally connected, or may be connected as a triode as schematically illustrated, with the anode 10 being connected directly to the filament 12 or to the second grid 9. The second grid 9 is then utilized as the plate, and one lead from meter 5, shunted by resistor 6, is connected to the negative terminal of battery 4. The positive terminal of battery 4 is connected to the second grid-anode junction. Filament current is provided by battery 3. Switch 11 is provided in the filament circuit to energize or de-energize the tube 1. The center electrode 7 of the ionization chamber 2 is connected directly to grid 8 of tube 1. The chamber is energized by battery 4, the outer electrode of the chamber being connected directly to the positive terminal thereof, while the central electrode 7 is connected to grid 8. While separate energizing batteries could be employed for the ionization chamber and the electric discharge device, it is more convenient to utilize the same battery for each. It will be noted that no high megohm input resistance is required to develop a signal voltage from the ion chamber current, unlike circuits of the prior art.

Figure 3:
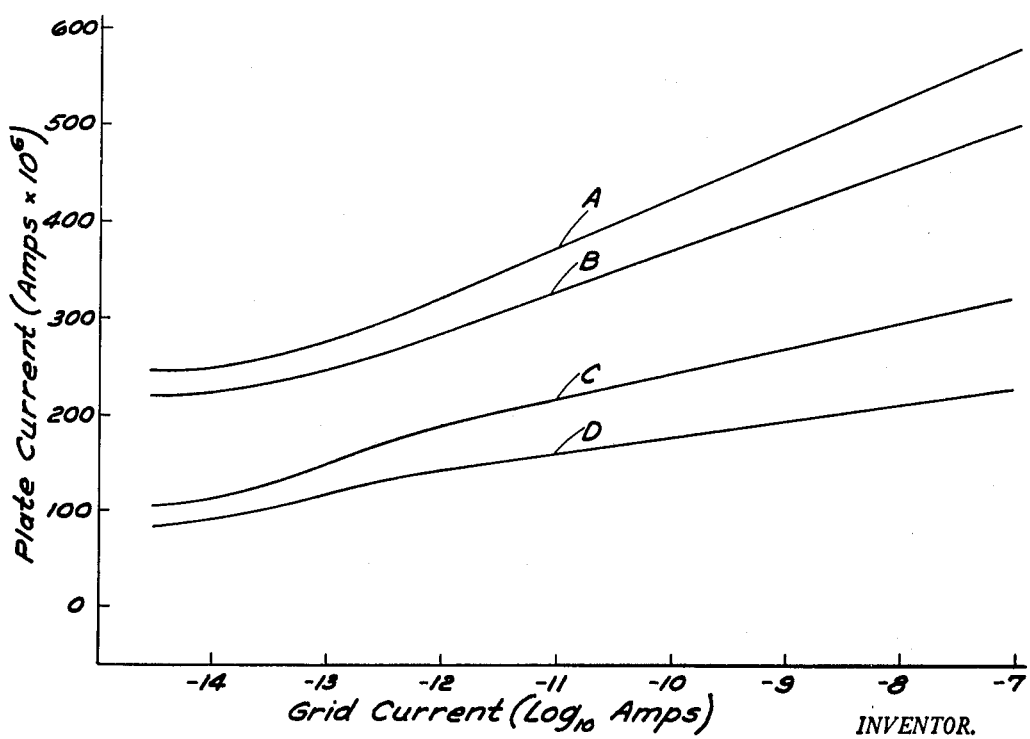
Fig. 3 illustrates a plot of the vacuum tube plate current vs. vacuum tube grid current for different embodiments of my invention.

Referring now to Fig. 3, four curves are illustrated: curves A and B employing the VX–32 type tube, and curves C and D employing the CK571AX type tube. It will be noted from these curves, taken with different load resistors, that the relation of grid current and plate current is logarithmic at all save the very lowest current ranges. To illustrate that different values of load resistance can be used, curves A and C were plotted with no load resistance other than the meter, curve B was plotted with 5000 ohms resistance, and curve D with 1000 ohms resistance.

Figure 1:
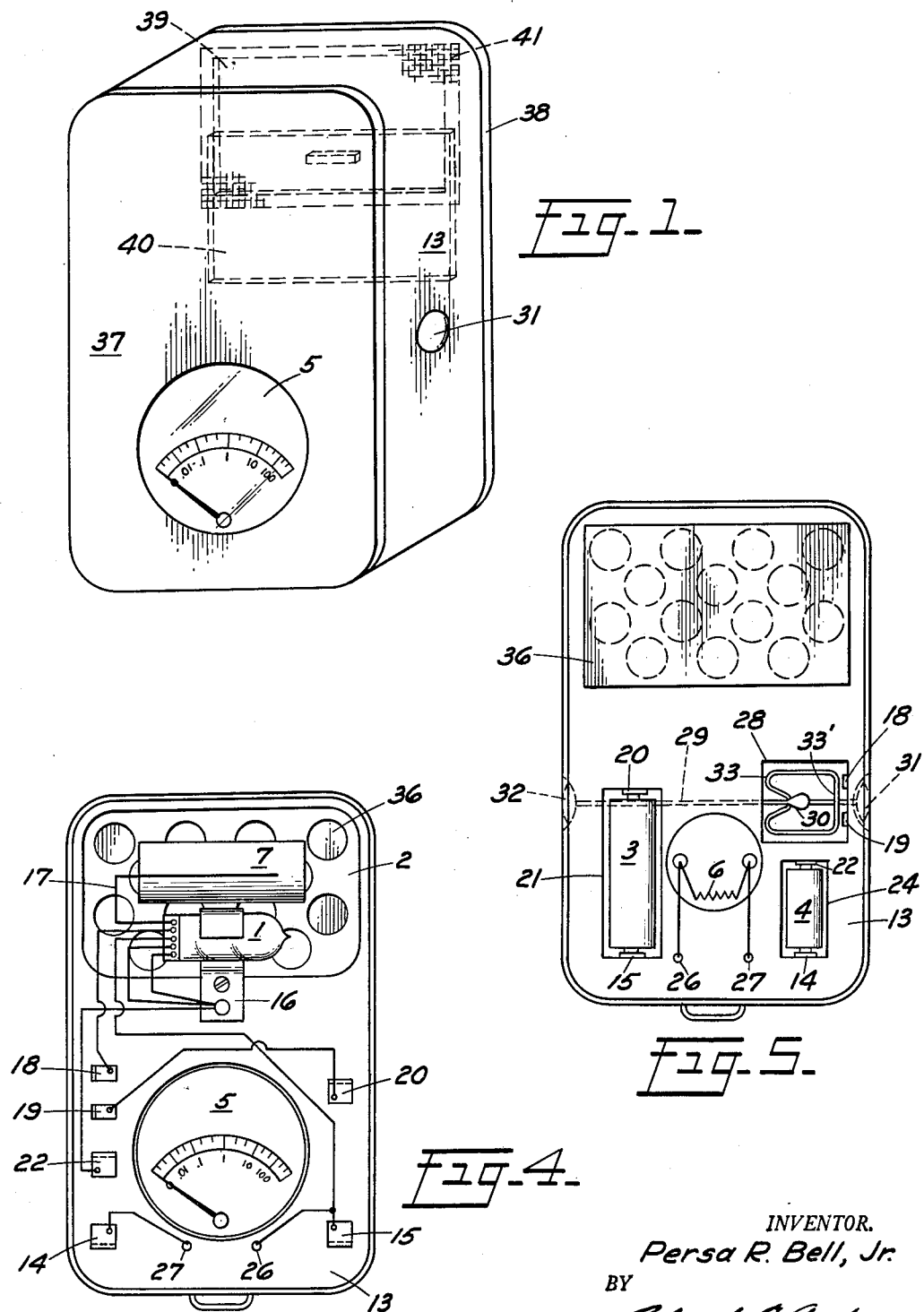

Referring now to Figs. 1, 4, and 5, the body of the instrument may be a rectangular bakelite block or molding 13 fitted with covers 37, 38 to form a meter only 4⅛" long, 2½" deep, and 1½" thick, for example. One end of the block may be provided with a large recess forming an ionization chamber 2, the inner walls of which are rendered conductive with a coating such as colloidal graphite, also known as Aquadag. The walls should be thick enough so that they will not crack if the device is dropped. The volume of the chamber may be, for example, 50 cc.; or any other suitable volume may be chosen, according to the sensitivity desired. Meter 5 may be located in a cavity provided for that purpose, so that the meter face will be flush with the surface of the block 13. Leads from the meter may be taken out through holes in the block and tied to terminal strips 14, 15, which may be simply brass strips mounted in the block 13. Vacuum tube 1 may be mounted conveniently on a similar brass strip 16, suspended within the ionization chamber 2, and making electrical contact with the conductive walls thereof. The grid lead 17 from the tube may be bent into position in approximately the center of the ionization chamber cavity, and may carry conductive curved foil 7, which serves as the central electrode of the ionization chamber. Other leads from the tube 1 may be brought out to terminal strips 15, 16 as shown. Strips 18, 19, 20, and 22 are provided for other necessary leads.

The back surface of block 13 is illustrated in Figure 5. Cavity 21 is provided with terminal strips 15, 20 adapted to make contact with the terminals of battery 3 which may be carried therein. Cavity 24 likewise provided with terminal strips 14, 22 to contact the terminals of battery 4 carried therein. The back surface of meter 5 is shown in place between the batteries, and the leads from the meter pass through holes 26, 27 in the block to engage mounting terminals 14, 15.

A simple form of on-off switch, not designed by the present inventor, may be incorporated in the survey meter, and may be disposed in cavity 28. Rod or wire 29, carrying bead 30, passes completely through the block 13 and terminates in small knobs 31, 32, flush with the case surface. In the position shown, the bead 30 presses bent spring member 33 to the left, so that the straight portion 33' does not engage contact members 18, 19. But when button 31 is pressed inward (to the left), the bead slides between confronting ends of the spring member and forces the member to the right. Then the flattened portion 33' completes the circuit between contacts 18 and 19. This switch assembly is shown on the schematic drawing of Figure 2 as switch 11, and is described only by way of illustration, forming no part of the present invention.

The front cover 37 of the instrument fits over the front surface of the block 13 and may be held securely by engagement of a pair of detents on the block with corresponding depressions in the cover. It may comprise a generally rectangular bakelite member having an aperture for reading meter 5 provided therein. The back cover 38 may be a similar bakelite member adapted to fit over the block 13, but carrying a window 39 with a slidable shutter 40. Across the window 39 is provided a protective screen 41 of open mesh, and a sheet of aluminum foil 36 is stretched across the back wall of the ion chamber, which wall is provided with a plurality of aligned apertures, as may be seen in Figure 5. When the meter is to be used for alpha or soft beta radiations, the shutter is opened by pulling it down over the electronic components, exposing the screen mesh 41. The foil 36 prevents ingress of dirt and dust, yet allows the soft radiations to enter.

In operation of the meter of my invention, incident radiations ionize the air inside chamber 2, causing positive ions to collect on electrode 7 and electrons to flow toward the walls of the chamber. The combined effect of these two currents raises the potential of the grid electrode 8 toward that of the chamber walls. Since the grid previously had no external current applied thereto, it was operating at its floating potential, and a small tube electron current was flowing from the filament to the plate. The floating potential is that potential of the grid where the electron current reaching the grid from the cathode or filament exactly equals the positive ion current to the grid, so that the net tube current to the grid is zero.

The rise in grid potential causes a proportional increase in the flow of plate current of tube 1 and a like increase in the deflection of meter 5. All the ionization current flow in the ionization chamber flows to the grid and it, together with the ion current in the tube, is balanced by the electron current reaching the grid from the cathode or filament. Since the ionization chamber current is proportional to the radiation intensity incident upon it, the grid current flowing through grid 8 will be likewise proportional to the radiation intensity. As may be seen clearly in Figure 2, the plate current will vary logarithmically with the grid current drawn by the tube. Deflection of the current indicating meter 5 will therefore vary first in a linear fashion with radiation intensity upon chamber 2, while the ionization current is very much smaller than the ion current in the tube; and will then vary approximately logarithmically when the ion chamber current becomes much larger than the ion current in the tube. This response is the linear, then logarithmic, response to radiation intensity which is desired, and provides high sensitivity and slow response at low levels of radiation, but fast response at dangerous radiation levels. Since some plate current flows in the tube even without any ion chamber current, it should be prevented from indicating on the meter scale by suppressing the zero of the meter using the meter spring. Alternatively, it could be balanced by an equal current from a battery and resistance.

With the size chamber shown in the drawings, the survey meter will detect radiations from 5 milliroentgens per hour up to 500 roentgens per hour, indicating such levels on the single logarithmic scale shown in Figure 3.

It will be apparent to those skilled in the art that I have invented a new and useful radiation detection device particularly adaptable for detecting and measuring radiations in the field. I have provided the desired linear-logarithmic response of indicating means to changes in radiation intensity so that I can monitor radiations from a very low level up to levels contemplated only in time of atomic disaster, with one simple instrument.

Having described my invention, I claim:

1. In combination, a vacuum tube having at least a cathode, a control grid, and an anode, a source of electrical potential operatively coupled between said anode and cathode, a source of cathode current, a meter in circuit with said anode, and an ion chamber including two electrodes, said control grid being connected solely to one of said electrodes and the other of said electrodes being connected to the positive terminal of said potential source.

2. Means for deriving an electrical signal which varies in a substantially logarithmic fashion with the intensity of incident radiation comprising a vacuum tube having cathode, control grid, and anode electrodes, means for establishing an anode-cathode potential of a selected value at which the grid voltage-plate current tube characteristic curve is substantially linear, an ion chamber connected in series circuit with the control grid and anode of said tube, said chamber having first and second electrodes electrically connected directly to said grid and anode, respectively, said connection of said control grid being the sole electrical connection thereof, and means in circuit with said anode and cathode for indicating the current flow to said anode.

3. Radiation detection means comprising a base member of substantial thickness provided with a recess having electrically conductive walls forming an ion chamber, a vacuum tube having at least anode, cathode, and control grid electrodes and suspended within said recess, electrical leads associated with said electrodes, said lead associated with said control grid being disposed within said recess to form the central electrode of said ion chamber, a source of potential carried by said base and coupled between said anode and cathode electrodes, current indicating means carried by said base and coupled in circuit with said anode and cathode, a source of cathode heater current carried by said base, a load resistor carried by said base and coupled in the anode-cathode circuit path and means coupling said walls to the positive terminal of said potential source.

4. A radiation meter for measuring the intensity of incident ionizing radiation comprising an ionization chamber provided with a pair of electrodes and a gaseous medium therebetween, a vacuum tube provided with cathode, anode, and grid electrodes, a source of cathode heater current means for energizing the anode-cathode path of said tube having positive and negative poles, one of said chamber electrodes being coupled to said positive pole for energizing said chamber, and the other of said chamber electrodes being coupled to said grid to derive its potential solely from the electron current and positive ion current to said grid in said tube in the absence of ionization of said medium, and to derive an additional potential from the conduction through said ion chamber to said grid of a current proportional to said intensity when said gas is ionized by incident radiation, and means for measuring the change in current flowing in said anode-cathode path due to said additional potential applied to said grid.

References Cited in the file of this patent

UNITED STATES PATENTS

| | | |
|---|---|---|
| 2,405,572 | Friedman | Aug. 13, 1946 |
| 2,472,365 | Borkowski | June 7, 1949 |
| 2,531,106 | Brown et al. | Nov. 21, 1950 |
| 2,531,804 | Carlin et al. | Nov. 28, 1950 |
| 2,536,617 | Weller | Jan. 2, 1951 |
| 2,596,500 | Molloy | May 13, 1952 |
| 2,646,515 | Lynch | July 21, 1953 |